United States Patent
Martin et al.

(10) Patent No.: US 8,156,017 B2
(45) Date of Patent: *Apr. 10, 2012

(54) SYSTEM AND METHOD FOR REAL-TIME ACTIVITY-BASED ACCOUNTING

(75) Inventors: Peter G. Martin, Carver, MA (US); Janet Lee Casler, Newton, MA (US)

(73) Assignee: Invensys Systems, Inc., Foxboro, MA (US)

(*) Notice: Subject to any disclaimer, the term of this patent is extended or adjusted under 35 U.S.C. 154(b) by 233 days.

This patent is subject to a terminal disclaimer.

(21) Appl. No.: 12/708,448

(22) Filed: Feb. 18, 2010

(65) Prior Publication Data

US 2010/0153245 A1 Jun. 17, 2010

Related U.S. Application Data

(63) Continuation of application No. 10/120,992, filed on Apr. 11, 2002, now Pat. No. 7,685,029.

(60) Provisional application No. 60/351,598, filed on Jan. 25, 2002.

(51) Int. Cl.
*G07B 17/00* (2006.01)
*G05B 19/18* (2006.01)
*G01N 37/00* (2006.01)

(52) U.S. Cl. .............................. 705/30; 700/2; 702/84

(58) Field of Classification Search ..................... None
See application file for complete search history.

(56) References Cited

U.S. PATENT DOCUMENTS

| | | | |
|---|---|---|---|
| 4,864,507 A | 9/1989 | Ebling et al. | |
| 5,134,574 A * | 7/1992 | Beaverstock et al. | 702/84 |
| 5,321,605 A | 6/1994 | Chapman et al. | |
| 5,400,253 A | 3/1995 | O'Connor | |
| 5,709,607 A | 1/1998 | Mowers et al. | |
| H1743 H | 8/1998 | Graves et al. | 700/236 |
| 5,799,286 A | 8/1998 | Morgan et al. | |
| 5,946,661 A | 8/1999 | Rothschild et al. | |
| 5,966,694 A | 10/1999 | Rothschild et al. | |
| 6,058,375 A | 5/2000 | Park | |
| 6,102,162 A | 8/2000 | Telcher | |
| 6,128,602 A | 10/2000 | Northington et al. | |
| 6,188,990 B1 | 2/2001 | Brook et al. | |
| 6,341,271 B1 | 1/2002 | Salvo et al. | |
| 6,345,259 B1 | 2/2002 | Sandoval | |
| 6,349,237 B1 | 2/2002 | Koren et al. | |
| 6,415,259 B1 | 7/2002 | Wolfinger et al. | |

(Continued)

OTHER PUBLICATIONS

Martin, Peter G., Bottom-Line Automation, Chapter 4, ISA—The Instrument, Systems and Automation Society, Research Triangle Park, NC, 2001.

(Continued)

*Primary Examiner* — Fahd Obeid

(74) *Attorney, Agent, or Firm* — Edward S. Jarmolowicz

(57) ABSTRACT

An accounting method and system is disclosed that provides for real time financial accounting of plant performance at a sub-plant level. A multiplicity of process variable transmitters is utilized to sense, in real time, the current state of the processes and process equipment used in a manufacturing plant. Sub-plant accounting modules utilize the sensed process data to calculate a plurality of sub-plant accounting measures, which are stored in one or more real time plant historian. The accounting measures are typically converted to a suitable format and subsequently stored in a production model accounting database where they are accessible to an accounting module.

27 Claims, 5 Drawing Sheets

U.S. PATENT DOCUMENTS

| | | |
|---|---|---|
| 6,507,825 B2 | 1/2003 | Suh |
| 2002/0016752 A1 | 2/2002 | Suh |
| 2002/0123945 A1 | 9/2002 | Booth et al. |
| 2002/0147668 A1 | 10/2002 | Smith et al. |
| 2003/0018503 A1* | 1/2003 | Shulman .......................... 705/7 |
| 2004/0115841 A1 | 6/2004 | Molnar |

OTHER PUBLICATIONS

Martin, Peter G., Appendix to Book, Temperature, pressure, flow, profit, Sep. 2001, ISA in Research Triangle Park, NC.

* cited by examiner

SYSTEM AND METHOD FOR REAL-TIME ACTIVITY-BASED ACCOUNTING

RELATED APPLICATION

This application is a Continuation of U.S. patent application Ser. No. 10/120,992 entitled A System And Method For Real-Time Activity-Based Accounting, filed on Apr. 11, 2002 now U.S. Pat. No. 7,685,029, which claims the benefit of U.S. Provisional Application Ser. No. 60/351,598, entitled A System and Method for Real-Time Activity-Based Accounting, filed Jan. 25, 2002.

BACKGROUND OF THE INVENTION (1) Field of the Invention

The present invention relates generally to accounting systems and/or enterprise resource planning (ERP) systems. This invention more particularly relates to a sensor based accounting system for providing real-time, activity based accounting for both unit and plant wide operations in a manufacturing plant.

(2) Background Information

Conventional cost accounting systems are typically inadequate as decision support systems or as a tool for the measurement and/or analysis of manufacturing performance. Most conventional cost accounting systems were designed as fiduciary reporting systems, which typically require monthly and/or quarterly reporting, rather than as decision control systems, which typically require real-time and daily feedback. Therefore, the information collected and reported does not tend to support minute-to-minute and/or day-to-day operational activities. Furthermore, the resolution of a conventional cost accounting system tends to be limited to plant level analysis. For example, a conventional cost accounting system records the total number or amount of product(s) made in a given unit of time (e.g., monthly) and divides that number or amount by the total costs (e.g., total energy consumption plus the total material costs plus fixed overhead costs) to arrive at a price per unit or price per unit volume. It therefore tends to be difficult to obtain accurate economic information on a unit operation or plant area level. These limitations tend to be acutely realized during cost benefit analysis of various process improvement activities. Senior management generally looks to a finance and/or accounting function for confirmation (especially as it relates to costs) of process improvements. Unfortunately, as described above, conventional accounting systems lack the information required (both at a unit operation level and temporally) to provide confirmation.

The limitations of conventional accounting systems have been addressed in part by Ebling, et al., in U.S. Pat. No. 4,864,507 entitled "Method and Apparatus for Process Manufacture Control", which is hereinafter referred to as the Ebling patent and which is fully incorporated by reference herein. The Ebling patent discloses a digital data processing apparatus for manufacturing process control having a production-modeling element for generating and storing a production model representative of various manufacturing relations. The production models may be configured to define the significant sub-plant components, such as the unit operations and plant areas, and to provide accounting information by these components. MARCAM® Corporation (Needham, Mass.) has successfully marketed this approach in both its PRISM® and PROTEAN® software packages, which are widely considered to be an improvement over conventional accounting systems, particularly for relatively complex operations, such as a specialty chemical plant in which a wide variety of resources are consumed in the production of a broad line of products, and/or wherein complex interrelationships exist between various unit operations. Nevertheless, despite its advantages and relatively successful commercial sales over the past decade, this approach remains limited in that it typically requires plant level costs, such as utilities, to be allocated (based on an arbitrary mechanism to the predetermined production model as described hereinabove) to each sub-plant component. This approach tends to limit the usefulness of such accounting systems since at the sub-plant level it only provides an estimate (based on the production model) of the actual accounting information. This approach is further limited as a decision support system (e.g., for critically evaluating process improvement measures) since the estimates tend to reinforce the production model assumptions rather than providing independently measured accounting data.

An alternate approach has been disclosed by Beaverstock, et al., in U.S. Pat. No. 5,134,574, entitled "Performance Control Apparatus and Method in a Processing Plant", which is hereinafter referred to as the Beaverstock patent and which is fully incorporated by reference herein. The approach of the Beaverstock patent is advantageous in that it discloses a sensor-based control apparatus for providing near real-time indication of the performance of plant operations. These dynamic performance measures (DPMs) are typically engineering measurements such as quality, yield, downtime, production volume, and/or production cost and may further be used to supplement conventional process control methodologies. Nevertheless, despite this advancement, the apparatus described in the Beaverstock patent tends to be limited in that it may be essentially thought of as an engineering tool for optimizing manufacturing processes. As such it does not provide for even the rudimentary accounting requirements of a plant, such as an accounting of profit and loss (at either a plant or sub-plant level). Furthermore, and partly as a result of the above, the dynamic performance measures (particularly those expressed as costs) tend to lack credibility with senior management and those in the accounting and/or financial functional areas of a business.

Therefore, there exists a need for an accounting system that overcomes the limitations of the systems described hereinabove and that provides near real time accounting measures at both plant and sub-plant (e.g., unit operations) levels and for near real time decision support for both the engineering and accounting functions of a manufacturing plant.

SUMMARY OF THE INVENTION

One aspect of the present invention includes a real-time activity based accounting system for a manufacturing plant having at least one manufacturing process. The accounting system includes at least one sub-plant accounting module configurable to receive process data from one or more sensors associated with the manufacturing process. The sub-plant accounting module includes computer readable program code for calculating one or more sub-plant accounting measures using the process data. A process historian is coupled to at least one of the sub-plant accounting modules. A translation module is coupled to the process historian. A production model accounting database is configured to receive the accounting measures from said translation module, and an accounting port is operatively associated with the production model accounting database, for interfacing with an accounting module.

Another aspect of the invention includes a real-time activity based accounting system for a manufacturing plant having at least one manufacturing process. The accounting system includes a multiplicity of process variable transmitters coupled to a plurality of process equipment in a manufacturing plant for providing signals indicative of the states of the manufacturing process and a plurality of sub-plant accounting modules configured to receive process data from one or more of the process variable transmitters, the sub-plant accounting modules including computer readable program code for calculating one or more sub-plant accounting measures from the process data. The accounting system further includes a process historian module, coupled to at least one of the plurality of sub-plant accounting modules, a translation module coupled to the process historian, the translation module including computer readable program code for formatting the sub-plant accounting measures stored in the process historian module into a suitable format, a production model accounting database configured for receiving, storing and partitioning accounting measures from the translation module, and an accounting module coupled to the production model accounting database, the accounting module configured to provide accounting and reporting functionality.

In another aspect, this invention includes a method for providing real-time, sensor-based accounting in a manufacturing plant. The method includes capturing process data with a multiplicity of process variable transmitters, the process variable transmitters being coupled to process equipment in the manufacturing plant. The method further includes computing a plurality of real-time, sub-plant accounting measures from the process data, and storing the real-time, sub-plant accounting measures in a process historian. The sub-plant accounting measures are converted into a format useful for an accounting system, and loaded into a production model accounting database. Sub-plant and plant level accounting functions are selectively performed on the accounting measures loaded in the production model accounting database to acquire an accounting analysis. Results are then displaying.

In yet another aspect, this invention includes a method for implementing a real-time activity based accounting system for a manufacturing plant having a plurality of manufacturing processes. The method includes analyzing plant production flow and manufacturing strategy, determining plant accounting requirements and required sub-plant accounting measures, and installing process variable transmitters. The method further includes building a plurality of sub-plant accounting modules, each of the plurality of sub-plant accounting modules including computer readable program code for receiving process data from at least one of the process variable transmitters and using the process data to compute one or more sub-plant accounting measures, configuring a process historian to receive real-time sub-plant accounting measures from the sub-plant accounting modules, programming a translation modules for formatting the real-time sub-plant accounting measures into a format suitable for the accounting system, and structuring a production model accounting database to include a plurality of sections relating to said plurality of manufacturing processes. An accounting module is configured for selectively performing sub-plant and plant level accounting analysis from sub-plant accounting measures stored in the production model accounting database.

DETAILED DESCRIPTION

Figure 1:
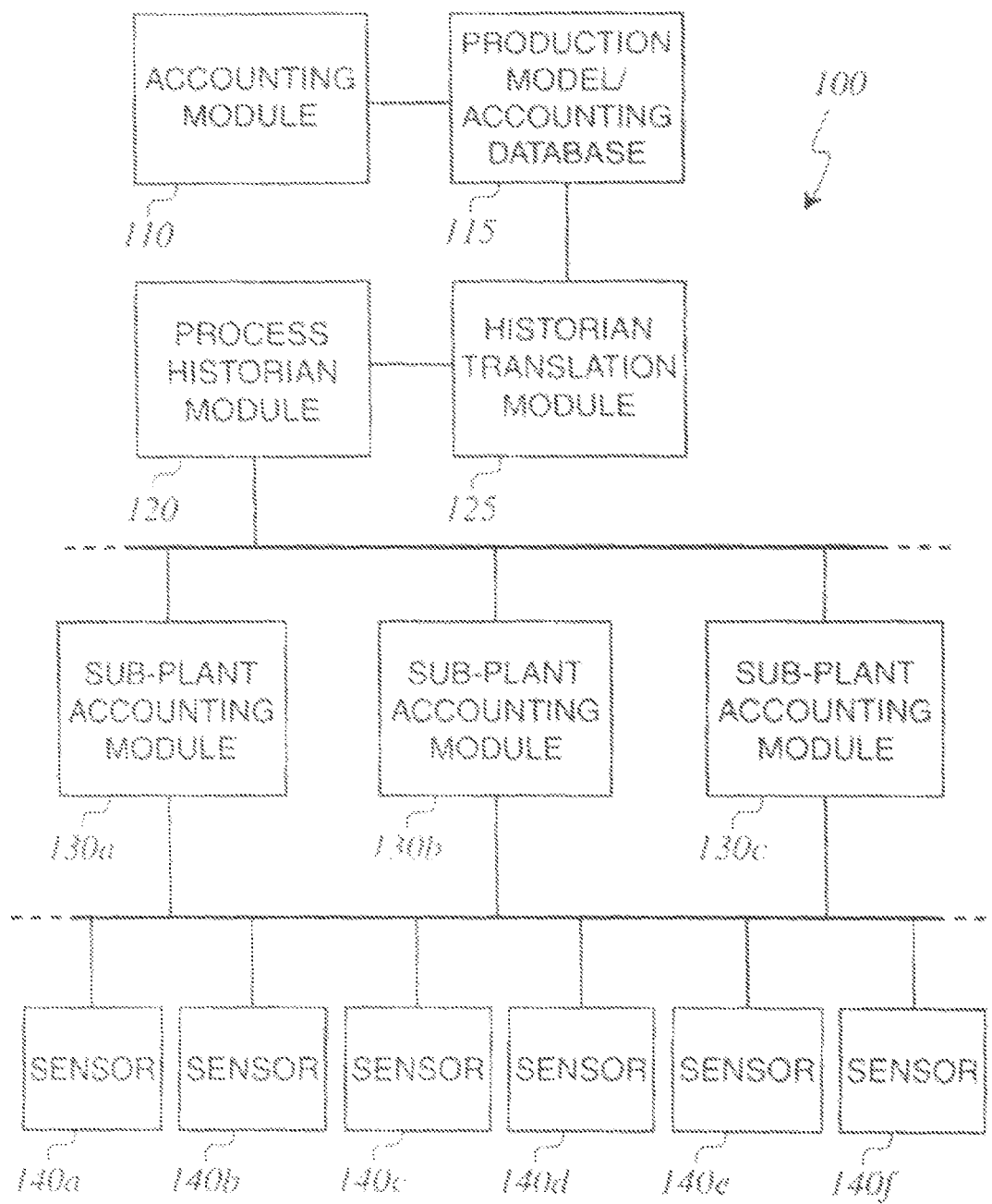
FIG. 1 is a block diagram of the accounting system of the present invention.

A manufacturing or process plant employs various and numerous items of equipment to implement different functions or effects on source materials to form desired finished products. The different pieces of equipment or groups thereof are generally referred to herein as process equipment. Examples of process equipment include vats, mixers, heating units, conveyer belts, pumps, evaporators, filters, boilers, generators, reaction chambers, and the like. The functions provided by the different pieces of equipment or groups thereof are generally referred to herein as processes or unit operations. Examples of processes include separation, mixing, evaporating, distilling, extracting, crushing, welding, polishing, and the like. Multiple processes or unit operations are often grouped together and referred to in the singular as a plant area. Further, where used in this disclosure, the term computer generally refers to any suitable processing device including, a programmable digital computer, microprocessor, microcontroller, etc., including dedicated, embedded, and general-purpose computers, programmable logic controllers (PLCs), workstations, and/or mainframes.

In general, the present invention includes a real-time, activity-based accounting system, typically for use in manufacturing and/or processing plants and may provide for real time (e g, minute-by-minute or day by day) financial accounting of plant performance at a sub-plant level (e.g., at a process equipment, unit operations, or plant area level). This invention generally employs real-time sensing of the current state of the processes and process equipment used in the manufacturing plant. The sensed process data is utilized to calculate sub-plant accounting measures (e.g., material cost, utility cost, or production rate for a single process), which are stored in one or more real-time plant historians (e.g., database management systems). The real-time sub-plant accounting measures are typically converted into a format suitable for an accounting system structured to provide both sub-plant and plant wide accounting analysis.

Referring briefly to FIGS. 1-4, an accounting system 100 according to the principles of the present invention is illustrated. System 100 includes a multiplicity of process sensors 140*a*, 140*b*, 140*c*, 140*d*, 140*e*, 140*f* (hereinafter referred to as 140*a-f*) configured for real time monitoring of process variables. In various embodiments, process sensors 140*a-f* include conventional process variable transmitters (e.g., available from Invensys Systems, Inc., Foxboro, Mass.), which capture and transmit sensed process data. These sensors 140*a-f* are linked to a plurality of sub-plant accounting modules 130*a*, 130*b*, 130*c* (hereinafter referred to as 130*a-c*), which convert the process data into sub-plant accounting measures (e.g., material costs at a unit operation level). The sub-plant accounting modules 130*a-c* are linked to at least one process historian 120, which stores the sub-plant accounting measures, and which is further linked (e.g., through a translation module 125 and production model database 115) to a plant accounting module 110, configured to provide standard accounting and reporting functionality. Translation module 125 formats the sub-plant accounting measures generated by sub-plant accounting modules 130*a-c* into a form suitable for plant accounting module 110. Production model database 115 is configured according to the particular process flow and accounting needs for the plant, and will be described in greater detail hereinbelow.

The present invention is advantageous in that it provides for both traditional plant accounting functions as well as a real time financial accounting of plant performance at a sub-plant level. This invention is further advantageous in that it provides for strategic decision support based on sensor based financial measures at both the plant and sub-plant levels. Further, this invention provides for financial analysis of plant and sub-plant performance and performance improvement measures in real time (e.g., hourly or daily). This invention is yet further advantageous in that it may overcome the drawbacks of the prior art systems described hereinabove. Other and still further advantages of this invention are described hereinbelow in a discussion of various embodiments thereof.

Referring now to the Figures in greater detail, as shown in FIG. 1, accounting system 100 (as well as systems 100', 100", and 100'" of FIGS. 2-4) includes a multiplicity of sensors 140a-f configured for real-time monitoring of process variables. Specifically, each sensor 140a-f typically provides signals indicative of the current state of one aspect of a particular process within a manufacturing plant. Depending upon the complexity of the manufacturing operation and upon the resolution of accounting data required to satisfy strategic objectives, system 100 may include any number of sensors 140a-f, typically ranging from a few for a relatively simple process to many hundreds or even thousands for a more complex process, such as an oil refinery. The sensors 140a-f may include substantially any type of device capable of sensing or generating data of interest such as but not limited to temperature, pressure, flow rate, velocity, volume, weight, pressure, voltage, and current sensors; analytical measurement devices, timers, counters, meters, control elements such as valves and switches, and/or other data logging devices. One example of a sensor 140a-f, including a process variable transmitter, includes a conventional mass flow meter for measuring the mass of fluid flowing through a conduit, such as an 83 Series Vortex™ flowmeter available from Invensys Systems, Inc.

Accounting system 100 further includes a plurality of sub-plant accounting modules 130a-c, each of which is configured to receive process data from one or more sensors and to calculate direct real-time sub-plant accounting measures therefrom. For example, in one embodiment, a sub-plant accounting module 130a-c includes an algorithm for converting flow rate data from a mass flow meter into feedstock cost for a single unit operation. Alternatively, another sub-plant accounting module 130a-c may include an algorithm for converting flow rate data from a mass flow meter into a production rate. Each sub-plant accounting module 130a-c thus provides an accounting measure (i.e., accounting data) for a particular aspect of the manufacturing process. System 100 may include any number of sub-plant accounting modules 130a-c, as described hereinabove with respect to sensors 140a-f, typically ranging from a few for a relatively simple process to many hundreds or even thousands for a more complex process.

Each sub-plant accounting module 130a-c includes computer readable program code for computing sub-plant accounting measures from real-time, sensor-based process data. Modules 130a-c are typically programmed using object oriented programming techniques known to those skilled in the art. For example, in one embodiment, the sensor-based process data is represented by input blocks, which are input into modules 130a-c by specifying the input block parameter(s) (e.g., field or record) of interest. A preprogrammed algorithm block may then perform computations on the obtained input data as directed by predetermined mathematical relationships. The output of modules 130a-c is typically stored in either a local or global historian 120 as described in more detail hereinbelow. The sub-plant accounting modules 130a-c are configured to execute (i.e., read the inputs from the input blocks and generate output blocks for storage in historian 120) at a predetermined frequency. This frequency of execution is dependent on the manufacturing process, process equipment, and the process sensors 140a-f, as well as on the operational strategies of the particular plant, but typically ranges from about ten per second to about one per minute. In one embodiment, each accounting module 130a-c includes e.g., a JAVA® (Sun Microsystems, Inc., Palo Alto, Calif.) application (or applet) that implements the receiving of the input block, calculation of the accounting measure(s), and the storing thereof into an output block (which may be accessed by historian 120) at a predetermined interval.

By way of example, and not limitation, an accounting module 130a-c useful in a power plant, such as may be found in any major industrial manufacturing operation, is considered. For instance, the objective of a power plant is to provide energy in its various forms to the various processing areas within the plant for operating a manufacturing process. For the purposes of this example, it is assumed that the power plant consists of two boilers and a generator. Steam from the two boilers is used both to drive the generator, which in turn, provides electricity for the plant, and to provide steam directly to a number of process units in the plant. The plant can also purchase electricity from a local utility and can sell excess electricity to the utility.

Efficient operation of this power plant requires ongoing decisions on the sourcing of plant steam and electricity. These decisions should be based on the best balance of costs and profits around the steam and electric generation and the market price of electricity sold through the external power grid. Making these decisions correctly and on the right time frame requires more information about the power operation available at a faster rate than has traditionally been available through either information management systems (e.g., enterprise resource planning (ERP) systems) or plant automation systems. According to the principles of this invention (and as described in more detail hereinbelow with respect to FIG. 5), one of the first steps in providing the required information involves a top down analysis of the manufacturing plant strategy to determine the necessary sub-plant accounting measures. For the purposes of this example it is assumed that the analysis identifies the cost of energy for each boiler, the cost of water to each boiler, the cost of steam for the generator, the value of electricity produced, and the spot price of electricity on the external grid. Each of these data points (with the exception of the spot price of electricity on the external grid) may be modeled in real time using sensor-based process data from the power plant. The power plant will employ numerous sensors, including mass flow meters for measuring the flow of water and steam, and load cells for measuring the quantity of fuel (e.g., coal) consumed in each of the boilers.

For the purposes of this example a real time accounting measure for the cost of steam to the generator may be calculated using Eq. 1 as follows:

(percentage of steam to the generator from boiler #1)×
[(incremental coal consumed×value of the coal)+
(incremental water consumed in boiler #1×value
of the water)]+(percentage of steam to the generator from boiler #2)×[(incremental gas consumed×value of the gas)+(incremental water consumed in boiler #2×value of the water)]       Eq. 1

It is appreciated that there are many possible approaches to the development of modules 130a-c of the present invention. It is also understood that one of ordinary skill in the art is familiar with the pertinent subroutines for running addition, subtraction, multiplication, division, averaging, percentage calculations, and the like.

As mentioned hereinabove, process historian module 120 is configured for storing the real-time sub-plant accounting measures. Historian module 120 is implemented in any suitable electronic data storage device, may be implemented in a computer, such as a personal computer (e.g., as available from Dell Computer Corporation, Round Rock, Tex.), workstation, or may include a dedicated machine such as an I/A Series™ historian or Aim* AT™ historian available from Invensys Systems, Inc., depending on the storage and analysis requirements thereof and the flexibility requirements of the user(s). Process historian 120 may include any suitable data storage module, including a commercial database, such as MICROSOFT® Access (Microsoft Corporation, Redmond, Wash.). However, process historian 120 may also include a custom database package suitable for relatively high speed and high volume storage of real-time data as is typically required in a manufacturing plant. In an exemplary embodiment, historian 120 includes a JAVA® applet that receives data from output blocks generated by accounting modules 130a-c, using SQL (Structured Query Language) and a JDBC (JAVA® Database Connectivity) to ODBC (Open Database Connectivity) bridge. The data is then stored in the database in the ODBC format. Historian 120 may be programmed to update at substantially any interval, but typically updates at least several times per day.

As also mentioned hereinabove, translation module 125 converts the raw sub-plant accounting measures data from historian 120 into a form suitable for plant accounting module 110 and/or production model 115 (described in more detail hereinbelow). For example, in order to reconcile the relatively high frequency operation of the real-time accounting measures 130a-c with the relatively lower frequency operation of a plant accounting module, averages and/or totals may be calculated at predetermined intervals. Translation module 125 typically utilizes data reduction techniques operating on a periodic basis to calculate the average, standard deviation, maximum, minimum, and/or total values over the specified period. For example, translation module 125 may compute hourly averages and/or totals from the real-time (e.g., per minute) sub-plant accounting measures calculated at modules 130a-c and stored in historian 120. The sub-plant accounting measures may also be reduced (e.g., averaged or totaled) at other intervals of interest, such as shift, daily, weekly, monthly, quarterly, and the like. These translated values are then typically stored within the historian 120 or in a separate database (or object) within translation module 125. In one embodiment, translation module 125 includes JAVA® applets configured to perform basic mathematical operations on the sub-plant accounting measures, such as calculating the average or the total in a predetermined time interval. Alternatively, translation module 125 may include one or more macros programmed using conventional subroutines (e.g., averaging subroutines).

As also described above, accounting system 100 includes a production model accounting database 115 linked to translation module 125. Production model accounting database 115 includes a database module, e.g., a commercially available database such as a MICROSOFT® SQL Server ORACLE® Enterprise Server (Oracle Corporation, Redwood Shores, Calif.), or IBM® DB2 (International Business Machines Corporation, Armonk, N.Y.), configured according to the production flow and accounting needs of a particular manufacturing plant. Typically, database 115 is a relational database having a predefined schema and is structured for enabling both general ledger accounting at plant level (such as is typically required by plant accounting and/or financial groups, and discussed below with respect to accounting module 110) and sub-plant accounting of various processes, process equipment, and/or plant areas. Production model accounting database 115 may be setup in any number of ways depending upon the particular process equipment being used and the manufacturing strategies of the plant. Typically the various process equipment, unit operations, and plant areas are defined in database 115 to enable the direct reporting of measures through translation module 125.

By way of illustration, and not limitation, in the power plant example described hereinabove, database 115 includes a power plant definition, which includes fields for storing accounting measures related thereto (e.g., the cost of energy for each boiler, the cost of water to each boiler, the cost of steam for the generator, and the value of electricity produced). As described above, data pertaining to these measures are stored in historian 120 (or translation module 125). These data may then be communicated to database 115 at a predetermined interval (the translation module 125 may 'push' data to database 115 or database 115 may 'pull' data from translation module 125). For example, accounting database 115 may issue standard database calls (e.g., in Open Database Connectivity (ODBC), Oley Process Control (OPC), or XML protocols) at predetermined intervals (e.g., shift, daily, weekly, monthly, etc.). Alternatively, for embodiments of historian 120 or translation module 125 that do not support standard database protocols, accounting database 115 may be provided with a software application, such as a JAVA® applet, configured to import the appropriate data from historian 120. For example, translation module 125 may be configured to export data into a flat file, which is then imported into database 115. An import program may be used to insert the data in the proper location in database 115 based on program code that maps the fields from the import file to the appropriate fields in database 115.

Figure 2:
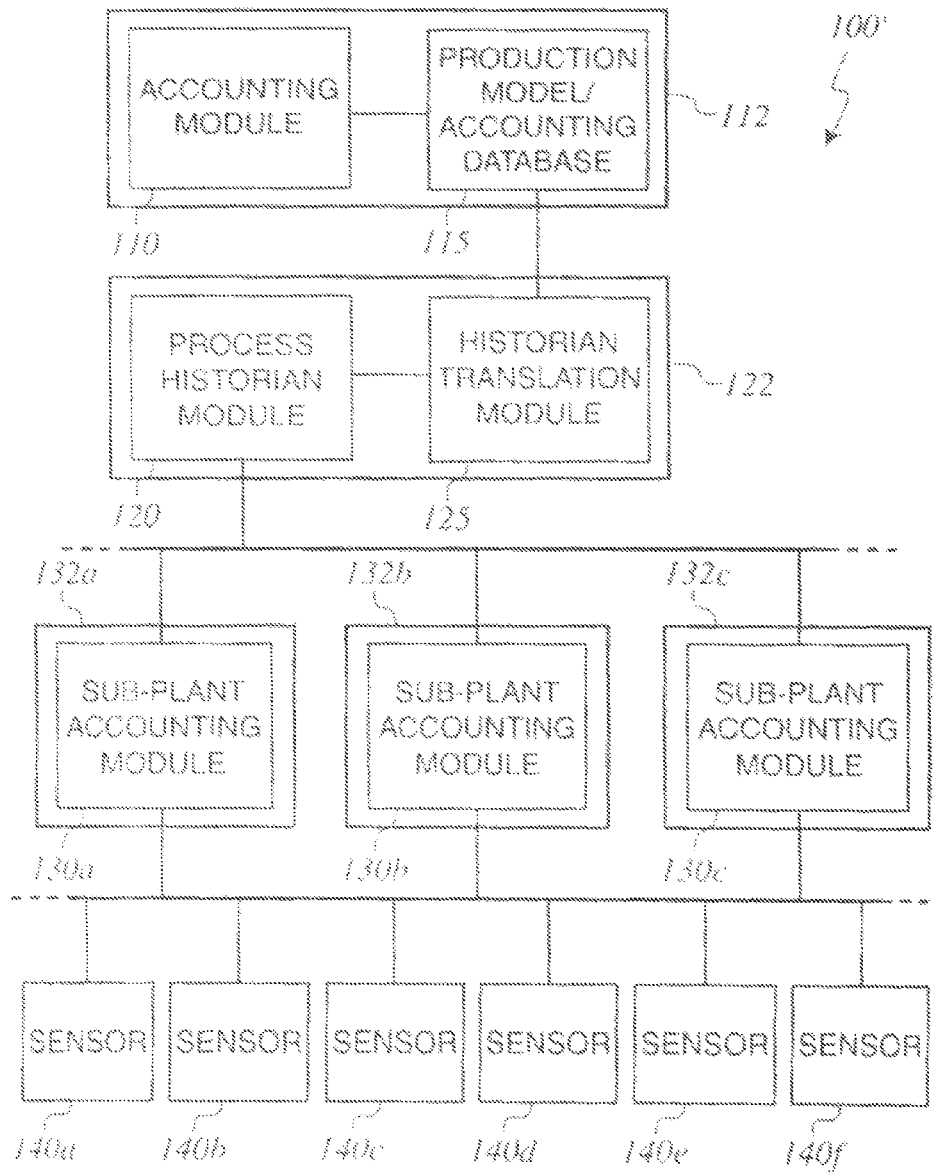
FIG. 2 is a block diagram of another embodiment of the accounting system of this invention.

Accounting system 100 further includes an accounting module 110 linked to production model accounting database 115. Accounting module 110 includes a software module providing standard accounting and reporting functionality (e.g., general ledger type functionality). The combination of accounting module 110 and accounting database 115 provides for both plant and sub-plant level accounting analysis at substantially any time interval (e g, minute-by-minute, day-by-day, and/or month-by-month). As transactions, such as usage, consumption, and production are measured via accounting measures 130a-c, journal entries are generated for posting to accounting module 110 so that appropriate accounts are debited and credited. Module 110 is configured to retrieve the appropriate data from accounting database 115 and make the required computations. Module 110 is typically further configured for reporting accounting analysis in one or more suitable formats (e.g., printed reports and/or on-line readable reports). Module 110 may be a commercially available accounting software package, such as those available from BAAN® Solutions (Baan Development, Netherlands), SAP® (SAP Artiengesellschaft, Federal Republic of Germany), and JDE® (J. D. Edwards & Company, Denver, Colo.) running on a suitable platform. The accounting system 100 of the present invention is typically implemented in a computer network, such as a local area network (LAN) including a relatively large number of computers. For example, in one embodiment 100' shown in FIG. 2, which is typically desirable for relatively complex manufacturing processes, a plant business computer 112 (or computer system) including accounting module 110 and production model accounting database 115 is linked to one or more process and/or plant area supervision computers 122, each of which includes a process historian 120 and a translation module 125. The process supervision computer(s) 122 are further linked to a plurality of process control computers 132a-c, each of which includes one or more sub-plant accounting modules 130a-c. Although FIG. 2 shows a single sub-plant accounting module 130a-c per process control computer 132a-c, the artisan of ordinary skill will readily recognize that a single process control computer 132a-c may also include two or more sub-plant accounting modules 130a-c. For example, in an alternate embodiment, a single process control computer 132a-c may be used for a single unit operation and include two or more sub-plant accounting modules 130a-c (e.g., one for utility costs, one for feedstock cost, and another for production rate).

Computers 112, 122, and 132a-c and process sensors 140a-f are typically linked using local area network (LAN) or other commercially available network connections configured to enable nominally any computer in the network having requisite permissions to obtain sub-plant accounting data from any other. Computers 112, 122, and 132a-c and process sensors 140a-f may also be linked using substantially any other networking protocol and hardware, such as a hardwired telephone line, a cellular telephone link, a fieldbus, an Ethernet or fast Ethernet interface, a LOCALTALK® connection, a satellite or other wireless connection, a commercial radio frequency (RF) communication link, an infrared communication link, or the like, including enhancements or alternatives thereto that may be developed in the future. Further, computers 112, 122, and 132a-c and sensors 140a-f may be configured for enabling a user to remotely connect thereto (e.g., direct dial-up using a modem) to obtain status, diagnostics, or other device information.

Figure 3:
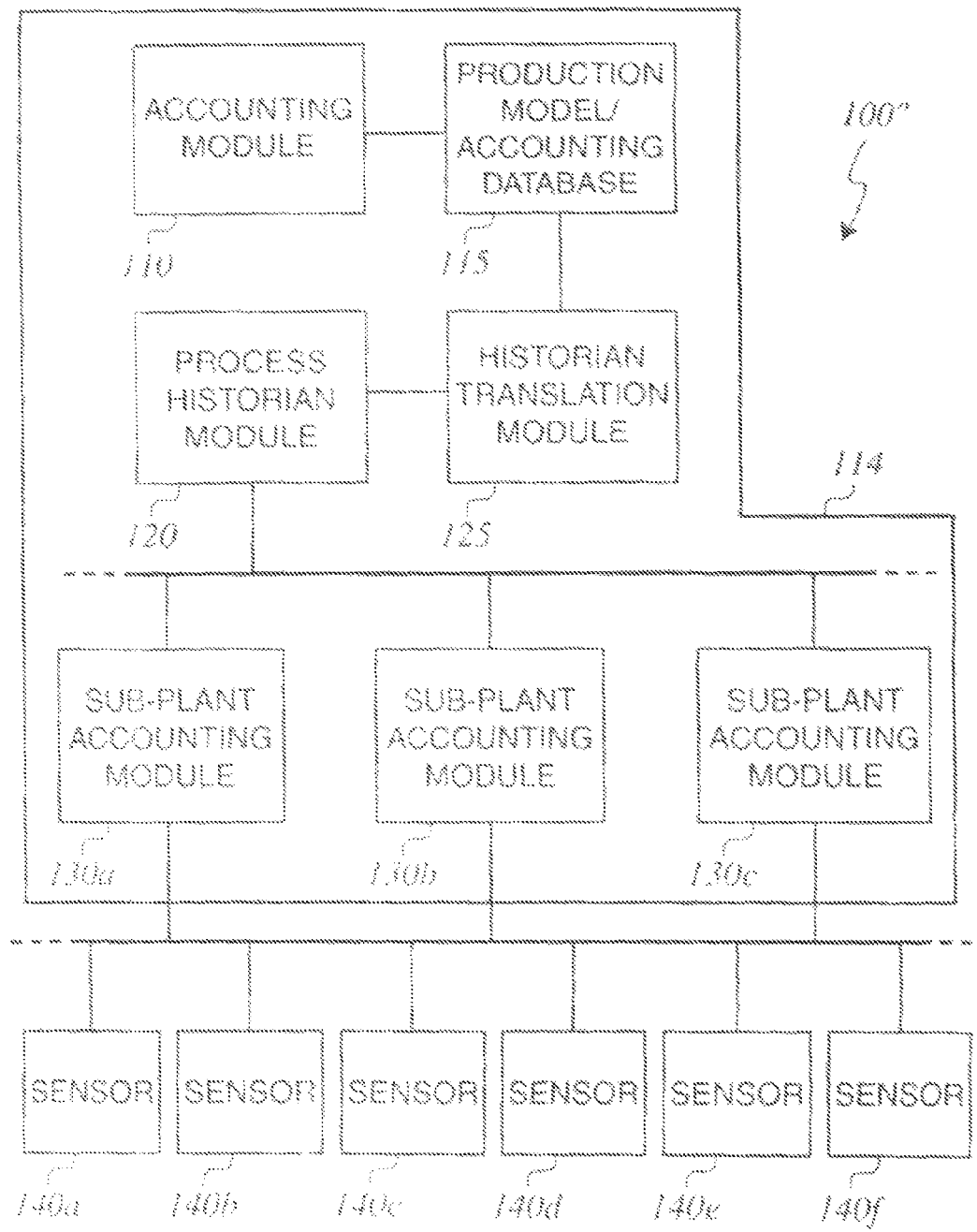
FIG. 3 is a block diagram of still another embodiment of the accounting system of this invention.

For relatively small and/or less complicated manufacturing plants (e.g., a typical food processing plant), system 100 may be implemented in a single computer as shown in embodiment 100" in FIG. 3. For example, accounting system 100" includes a single computer 114 (including modules 110, 115, 120, 125, and 130a-c) linked to a multiplicity of sensors 140a-f. Alternatively, system 100 may be implemented in two or more computers as shown in embodiment 100''' in FIG. 4. For example, system 100''' includes a plant business computer 112, including an accounting module 110 and a production model accounting database, linked to a plant area supervision computer 124, which includes process historian 120, translation module 125 and a plurality of sub-plant accounting modules 130a-c, and is linked to a multiplicity of sensors 140a-f.

Figure 4:
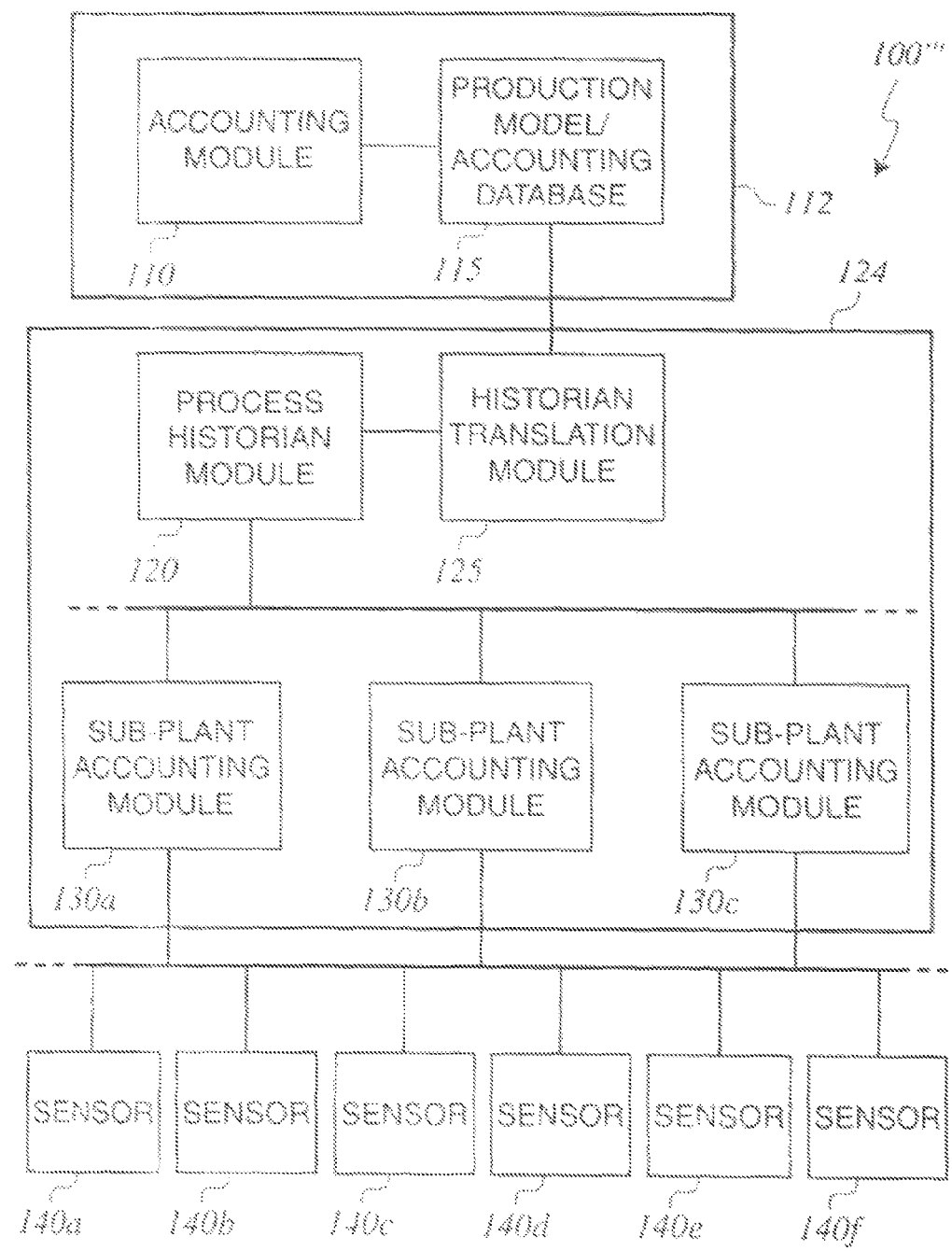
FIG. 4 is a block diagram of yet another embodiment of the accounting system of this invention.

Additionally, each computer, shown in FIGS. 2-4, may include one or more graphical user interface (GUI) having various function menus and/or icons, which may be actuated by a user to effect various functions known to those skilled in the art of GUIs.

Figure 5:
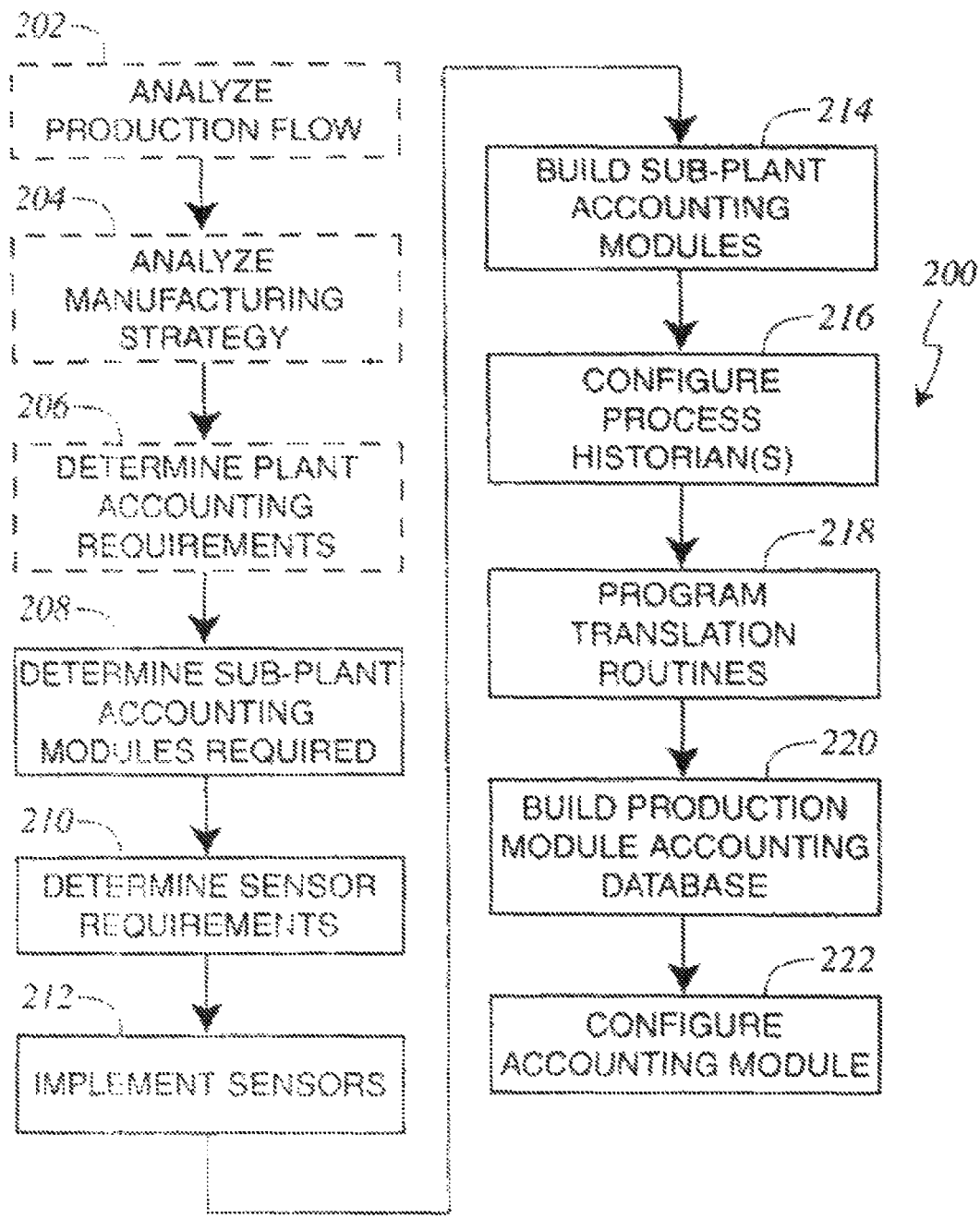
FIG. 5 is a flow chart of a method for implementing the accounting systems of FIGS. 1-4 in a typical manufacturing plant environment.

Referring now to FIG. 5, one embodiment of a method 200 for implementing the accounting system 100 of the present invention is discussed. The actual sub-plant accounting measures (e.g., calculated in modules 130a-c) required for a particular plant operation are a function of both the functional layout of the plant processes and the manufacturing and/or accounting strategies. The sub-plant accounting measures that are most appropriate for various unit operations or groups thereof in one plant may not be appropriate at all for another plant (even for another plant of a similar type). Therefore, prior to the physical installation of the accounting system 100 of this invention, this method includes optional portions 202, 204, and 206. These optional portions include analyzing both the production flow 202 and the plant manufacturing strategy 204, from which plant accounting requirements 206 and the necessary sub-plant accounting measures 208 may be determined (blocks 202, 204, and 206 shown in phantom in FIG. 5). By way of example (and not limitation) a manufacturing plant with a strategy of reducing costs may require a relatively high degree of detail regarding utilization of raw materials and energy through the plant. This plant may therefore require a relatively large number of sub-plant accounting modules 130a-c to accurately track real time raw material and energy consumption at the processes. Alternatively, a manufacturing plant with a principle strategy of increasing throughput may require a relatively high degree of detail regarding rate of output at each of the unit operations and may therefore require a relatively large number of sub-plant accounting modules 130a-c pertaining thereto.

Once the specific sub-plant accounting measures have been determined, the sensor information required 210 to make the measures is determined. In many manufacturing plants the required sensors 140a-f are already installed in the process or with process equipment of interest. In some cases, new sensors need to be installed 212 to complete the collection of sensor-based information required to compute the necessary sub-plant accounting measures. Installation of the sensors includes connecting them (e.g., via their process variable transmitters) to a network and/or directly to the appropriate sub-plant accounting modules. Installation may further include constructing input blocks for each of the required sensor-based inputs. These blocks convert the incoming sensor signals (either analog or digital) into digital values in the engineering/economic units required for the calculation of the sub-plant accounting measures. As discussed above, each input block typically includes a collection of records or fields, each of which holds particular process data. The input block may also provide for general system (or network) access to process data.

After determining the sub-plant accounting measures and implementing the required sensors at steps 208 and 212, the sub-plant accounting modules are built 214. As described hereinabove, the sub-plant accounting modules 130a-c are typically programmed using object oriented programming techniques known to those skilled in the art. For each module 130a-c, an algorithm block is typically programmed. Each algorithm block is programmed to request or otherwise obtain process data from one or more specific input blocks, perform calculations thereon as directed by the mathematical relationships set forth in the algorithm block, and direct the output of the calculations to an output block.

A process historian 120 is configured 216 to receive the computed accounting measures (e.g., from the above mentioned output blocks) as described hereinabove. Translation routines (or translation blocks) are programmed at block 218. These routines may be programmed in substantially any manner but are commonly programmed using either object oriented programming techniques or by creating macros using subroutines available in historian 120.

At block 220, a production model accounting database 115 is configured. Based on the prior analysis (e.g., generated at blocks 202, 204, 206, and 208), database 115 includes definitions representative of the various unit operations (or alternatively the plant areas or the equipment) in the plant. At block 222, accounting module 110 is configured to perform the desired accounting analysis and reporting utilizing data from predetermined partitions within database 115.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A real-time activity based accounting system including a computer usable medium having computer readable code therein, for a manufacturing plant having at least one manufacturing process, said accounting system comprising:
   a plurality of sub-plant accounting modules configurable to receive process data from a plurality of sensors associated with the manufacturing process;
   said sub-plant accounting modules including computer usable medium having computer readable program code therein for calculating a plurality of sub-plant accounting measures using the process data of the plurality of mutually distinct process variables, for posting to an accounting module;
   a process historian coupled to said sub-plant accounting modules;
   a translation module coupled to said process historian;
   the translation module configured to receive and aggregate the plurality of sub-plant accounting measures;
   a production model accounting database having a plurality of sections configured for modeling the manufacturing process in the manufacturing plant;
   the production model accounting database configured to receive and selectively place the aggregated accounting measures from said translation module into said plurality of sections in real-time; and
   an accounting port operatively associated with said production model accounting database, said accounting port being couplable with the accounting module, wherein the accounting system is configured to supply real-time, aggregated data from the production model accounting database to the accounting module;
   wherein the accounting system is configured to move data along a hierarchically upward data path from the sensors, to the sub-plant accounting modules, to the production model accounting database, the accounting port, and to the accounting module.

2. The accounting system of claim 1, wherein said translation module comprises a computer usable medium having computer readable program code therein for formatting the sub-plant accounting measures stored in said process historian module.

3. The accounting system of claim 1, wherein said production model accounting database is configured to receive, store and partition the accounting measures.

4. The accounting system of claim 1, comprising a plurality of sub-plant accounting modules.

5. The accounting system of claim 4 wherein each of said plurality of sub-plant accounting modules comprises an algorithm block for computing one or more sub-plant accounting measures from the process data.

6. The accounting system of claim 1, comprising an accounting module coupled to said accounting port.

7. The accounting system of claim 6, wherein said accounting module is configured to provide accounting and reporting functionality.

8. The accounting system of claim 6 wherein said sub-plant accounting module, said process historian module, said translation module, said production model accounting database, and said accounting module, are disposed within a single computer.

9. The accounting system of claim 8 wherein said single computer comprises a member selected from the group including a personal computer and a workstation.

10. The accounting system of claim 6 wherein:
    said accounting module and said production model accounting database are disposed in a first computer; and
    said process historian, said translation module and said sub-plant accounting module are disposed in a second computer.

11. The accounting system of claim 6 wherein:
    said accounting module and said production model accounting database are disposed in a first computer;
    said process historian and said translation module are disposed in a second computer; and
    a plurality of sub-plant accounting modules are disposed in a plurality of other computers.

12. The accounting system of claim 6, wherein said accounting module and said production model accounting database are disposed in separate computers.

13. The accounting system of claim 1 configured to provide real-time accounting on a time scale ranging from about second-by-second to about year-by-year.

14. The accounting system of claim 13 configured to provide real-time accounting on a time scale ranging from about hour-by-hour to about month-by-month.

15. The accounting system of claim 1, comprising a plurality of process variable transmitters couplable between the sensors and said sub-plant accounting module.

16. The accounting system of claim 15, comprising at least one sensor coupled to each of said process variable transmitters.

17. The accounting system of claim 16 wherein said sensors comprise flow meters, weight sensors, volume sensors, velocity sensors, pressure sensors, temperatures sensors, analytical measurement devices, counters, voltage sensors, current sensors, meters, and timers.

18. The accounting system of claim 1 wherein said at least one manufacturing process comprises process equipment selected from the group consisting of vats, mixers, heating units, conveyer belts, pumps, evaporators, filters, boilers, reaction chambers, generators, and combinations thereof.

19. The accounting system of claim 1, comprising a graphical user interface configured to display accounting data generated by said accounting system.

20. The accounting system of claim 1 wherein said plurality of sub-plant accounting measures comprise a computer usable medium having object oriented computer readable program code embodied therein.

21. The accounting system of claim 1 wherein said translation module is configured to selectively average and total the accounting measures at predetermined intervals.

22. The accounting system of claim 21 wherein said predetermined intervals are selected from the group consisting of hourly, shift, daily, weekly, biweekly, monthly, bimonthly, quarterly, and combinations thereof.

23. The accounting system of claim 1 wherein said production model accounting database comprises a plurality of sections configured for modeling a plurality of manufacturing processes in the manufacturing plant.

24. The accounting system of claim 23 wherein said production model accounting database is configured to issue database calls to said translation module at predetermined intervals to receive said accounting measures.

25. The accounting system of claim 24 wherein said database calls comprise:
  pointers for locating accounting measures within said translation module; and
  information regarding into which of said plurality of sections said accounting measures are to be stored.

26. The accounting system of claim 23 wherein said translation module is configured to insert said accounting measures into said production model accounting database at predetermined intervals.

27. A real-time activity based accounting system for a manufacturing plant having at least one manufacturing process, said accounting system comprising:
  a plurality of process variable transmitters coupled to process equipment in the manufacturing plant for providing process data from a plurality of sensors associated with the manufacturing process, the plurality of sensors configured to detect a plurality of mutually distinct process variables of the manufacturing process;
  a plurality of sub-plant accounting modules configured to receive process data from one or more of said process variable transmitters;
  said sub-plant accounting modules including a computer usable medium having computer readable program code therein for calculating one or more sub-plant accounting measures from the process data of the plurality of mutually distinct process variables;
  a process historian module, coupled to at least one of said plurality of sub-plant accounting modules;
  a translation module coupled to said process historian, said translation module including a computer usable medium having computer readable program code therein for formatting the sub-plant accounting measures stored in said process historian module into a suitable format;
  the translation module configured to receive and aggregate the plurality of sub-plant accounting measures;
  a production model accounting database having a plurality of sections configured for modeling the manufacturing process in the manufacturing plant;
  the production model accounting database configured for selectively receiving, storing and partitioning the aggregated accounting measures from said translation module into said plurality of sections in real-time; and
  an accounting module coupled to said production model accounting database, said accounting module configured to receive aggregated data from the production model database, to provide accounting and reporting functionality for the manufacturing process in real-time;
  wherein the accounting system is configured to move data along a hierarchically upward data path from the sensors, to the sub-plant accounting modules, to the production model accounting database, the accounting port, and to the accounting module.

* * * * *